United States Patent [19]
Abrioux et al.

[11] 3,946,606
[45] Mar. 30, 1976

[54] DEVICE FOR MEASURING THE FORCE REQUIRED TO UNTANGLE HAIR

[75] Inventors: Andre Abrioux, Drancy; Daniel Bauer, Le Raincy; Jules Leroy, Vincennes, all of France

[73] Assignee: L'Oreal, Paris, France

[22] Filed: Nov. 15, 1973

[21] Appl. No.: 416,016

[30] Foreign Application Priority Data
Nov. 20, 1972 France ................................ 72.41141

[52] U.S. Cl. ................ 73/160; 73/141 R; 132/11 R
[51] Int. Cl.² ..................... G01L 5/00; A45D 24/10
[58] Field of Search ...... 73/136 C, 141 R, 160, 492, 73/379, 380, 381, 9; 132/11 A, 11 R, 45 A, 148, 151

[56] References Cited
UNITED STATES PATENTS

| | | | |
|---|---|---|---|
| 2,199,955 | 5/1940 | Kruck | 73/381 X |
| 2,578,533 | 12/1951 | Garrahan, Jr. | 73/136 C |
| 2,926,898 | 3/1960 | Taylor | 73/492 |
| 2,937,528 | 5/1960 | Ketchum | 73/141 |
| 3,459,197 | 8/1969 | Wilson | 132/11 R |

*Primary Examiner*—Richard C. Queisser
*Assistant Examiner*—John S. Appleman
*Attorney, Agent, or Firm*—Brisebois & Kruger

[57] ABSTRACT

Device for measuring the force required to untangle hair comprises a handle, a carding member mounted for pivotal movement about the axis of said handle, and a counter for measuring the sum of the amplitudes of successive pivotal movements of said carding member relative to said handle.

19 Claims, 6 Drawing Figures

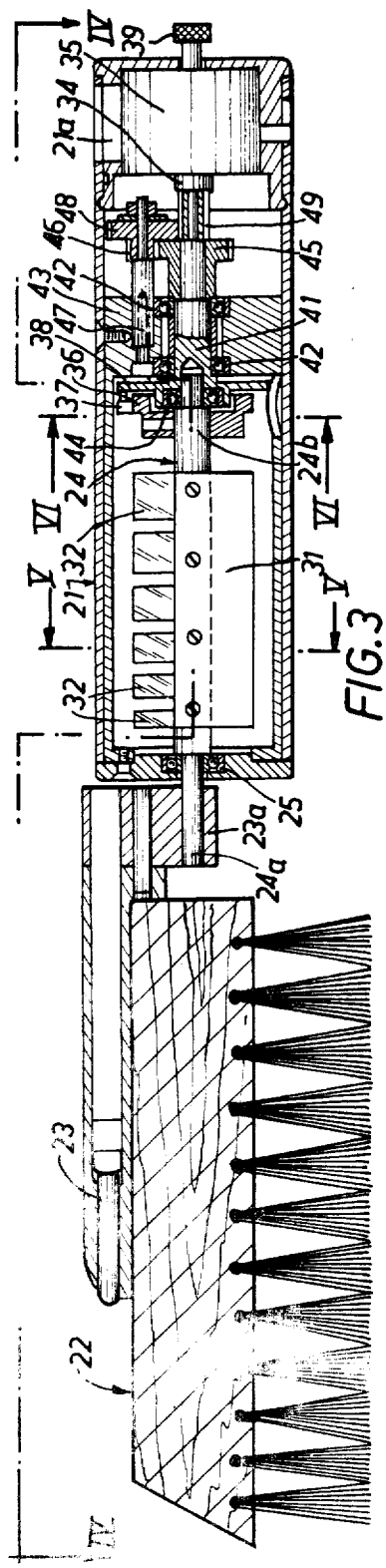
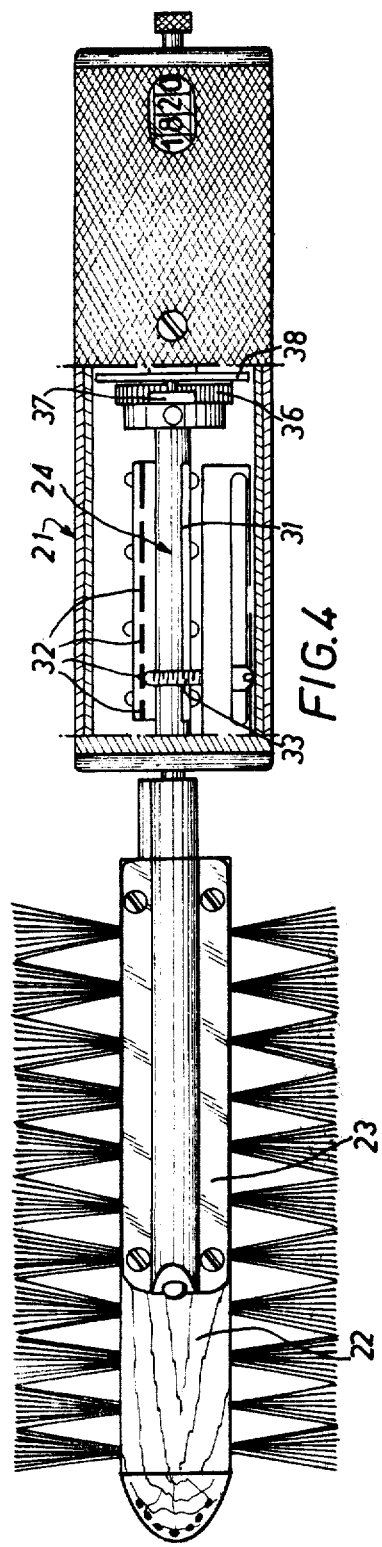
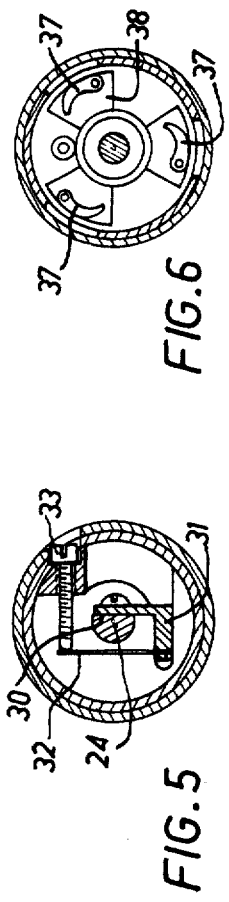

DEVICE FOR MEASURING THE FORCE REQUIRED TO UNTANGLE HAIR

SUMMARY OF THE INVENTION

In order to compare the characteristic properties of cosmetic products such as shampoos for example, it is often necessary to compare the property of being more or less easily entangled which they impart to the hair, regardless of the form of the hair itself, whether it consists of locks, wigs, or a head of hair. It is clear that the more the application of a product or composition facilitates untangling, for example, after shampooing, the more advantageous the use of this product or composition is in practice. Up to the present it has been impossible to evaluate the property of facilitating the untangling of hair in other than a subjective manner and this has made it difficult to carry out comparisons. In order to eliminate one source of errors resulting from differences in the nature of hair from one head to another in the case of a head of hair, and differences in the method of application resulting from the applicators themselves, comparisons have been made between the hair on one half of a head treated with a particular product and the hair on the other half of the same head treated with another product, or not treated at all. However, despite the elimination of these sources of error, the comparison has remained relatively subjective.

It is the object of the present invention to describe carding means making it possible to measure the total of the untangling forces exerted on hair treated with a hair treating product of any type and compare them with the total of the untangling forces exerted on untreated hair. This measurement takes into account the total of all the maximum forces exerted in the course of combing or brushing from the beginning to the end of the operation. It will be appreciated that, when the hair is untangled, the average combing or brushing stroke does not require any effort. The carding means according to the invention is preferably used as indicated above, that is to say in order to carry out comparisons on the two halves of a single head of hair, which halves have been differently treated, or one of which may not have been treated at all. This method of operation makes it possible to eliminate the influence of the nature of the air on their entanglement.

It should be noted that the effect in facilitating untangling may be tested on either damp hair or on dry hair. However, the movements of the carding device in the two cases are different. In the case of damp hair specialists have the habit of imparting to the combing means a translational movement resulting from the displacement of the entire arm which holds the comb or brush. On the contrary, when untangling dry hair specialists press the carding device into the hair until it is in substantial contact with the head and then impart to this device a rotary or pivotal motion produced by the hand which holds it. Because of the difference between the movement imparted to the carding device to untangle damp and dry hair, applicants have been led to propose two distinct types of carding devices according to the invention, each adapted to one of the said untangling movements.

It is the object of the present invention to provide the new article of manufacture which consists of a carding device adapted to measure the difficulty of untangling a mass of hair which device comprises a handle to be held in the hand and a comb characterized by the fact that the comb is movable with respect to the handle through an angle of limited amplitude when force is exerted thereon, said comb being biased by return spring, and counter responsive to the relative movements between the comb and the handle for counting the total of the amplitudes of these relative movements.

In a preferred embodiment, the counter is driven by a rotary shaft which is itself responsive to the relative movement between the handle and the comb through a clutch. The rotary shaft of the counter is associated with a non-return device permitting its rotation in one direction but preventing such rotation in the other. The non-return device consists of a ratchet wheel cooperating with a least one pawl. In one embodiment the non-return device constitutes the clutch. Step-up or step-down gearing is positioned between the clutch and the control shaft of the counter. The return spring which acts on the comb is a leaf spring, one end of which is fixed to the comb and the other end of which rests against a member fixed to the handle. The member fixed to the handle against which the drawspring acts is a screw, the position of said screw being adjustable to permit the adjustment of the return force to which the comb is subjected. The comb may be replaced by a suitable brush.

In a first embodiment, designed particularly for untangling damp hair, the comb is connected to the handle through a universal joint having two substantially perpendicular axes. The first of these two axes is substantially perpendicular to the longitudinal median plane of the comb. The comb is fixed to a rod positioned on the side of the universal joint remote from said comb, said rod being subjected to the action of two springs, one of which counterbalances the weight of the comb with respect to the first axis of the universal joint while the other exerts a pulling force during relative movement of the comb with respect to the handle about a second pivotal axis of the universal joint. One zone of the rod rests against a friction wheel fixed to the drive shaft of the counter, the pressure being increased when the combing tends to turn about the first pivotal axis of the universal joint in response to a force directed in a direction opposite to that of the weight of the comb.

In a second embodiment of the invention a brush is fixed to a crank shaft which is mounted to pivot about the axis of the handle. The crank shaft is fixed to at least one leaf spring bearing against a stationary member on the handle. The connection between the crank shaft and the control shaft of the counter is through a clutch consisting of a ratchet wheel and a pawl support, the clutch being effective in only one direction of rotation. The ratchet wheel is carried by the crank shaft and the pawl support is fixed to the control shaft of the counter. The end of the crank shaft is supported in a bearing mounted in the central part of the pawl support. Between the support for the pawl and the control shaft of the counter is a gear train making it possible for the control shaft of the counter to rotate through an angle having an amplitude greater than the amplitude of the angle through which the crank shaft rotates.

It will be seen that the carding means according to the invention makes it possible to total the maximum forces applied to the comb in the course of an untangling operation. It is obvious that it is desirable to be able to adjust the sensitivity of the springs so that the maximum untangling forces encountered do not bring the comb up against an abutment in its position of maximum displacement relative to the handle. In order to take into account this necessity for regulating the sensitivity, in the preferred embodiments, a regulating screw is provided which makes it possible to adjust the return force applied to the comb.

When damp hair is being untangled, the comb swings with respect to the handle like a door with respect to its door jamb, and the maximum amplitudes of angular displacement of the comb with respect to the handle during untangling are totalled by means of the counter. On the contrary, when dry hair is being untangled the difference in the action of the user of the carding means is taken into account and the counter totals the maximum amplitudes of the rotations of the brush about the crank shaft, the effort exerted being the maximum torque exerted with respect to the axis of said crank shaft.

It is clear that the invention is not limited to a hand-held combing means. It is equally applicable to the case of a stationaray apparatus on which a mass of hair is combed by displacing the hair with respect to the apparatus either manually or mechanically.

In order that the invention may be better understood, two embodiments thereof will now be described, purely by way of illustration and example, with reference to the accompanying drawings, on which:

FIG. 3 is a longitudinal section taken through carding means adapted to card dry hair, taken along the longitudinal median plane of the brush of said carding means;

FIG. 4 is a top view, partially in section taken along the line IV—IV of FIG. 3;

FIG. 5 is a transverse sectional view taken along the line V—V of FIG. 3; and

FIG. 6 is a transverse sectional view taken along the line VI—VI of FIG. 3.

Figure 1:
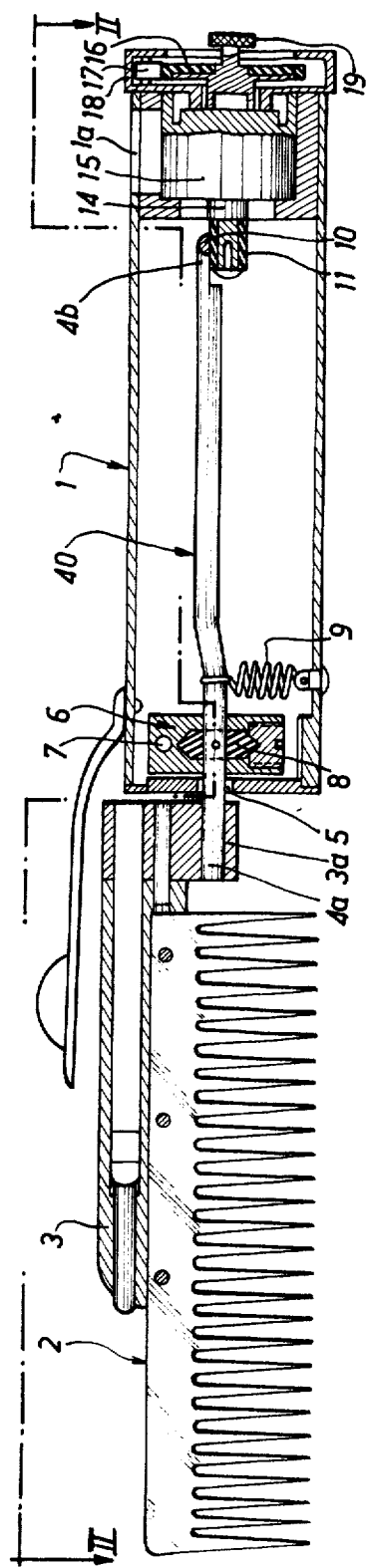
FIG. 1 is a longitudinal section taken along the longitudinal median plane of carding means designed to untangle damp hair.
Figure 2:
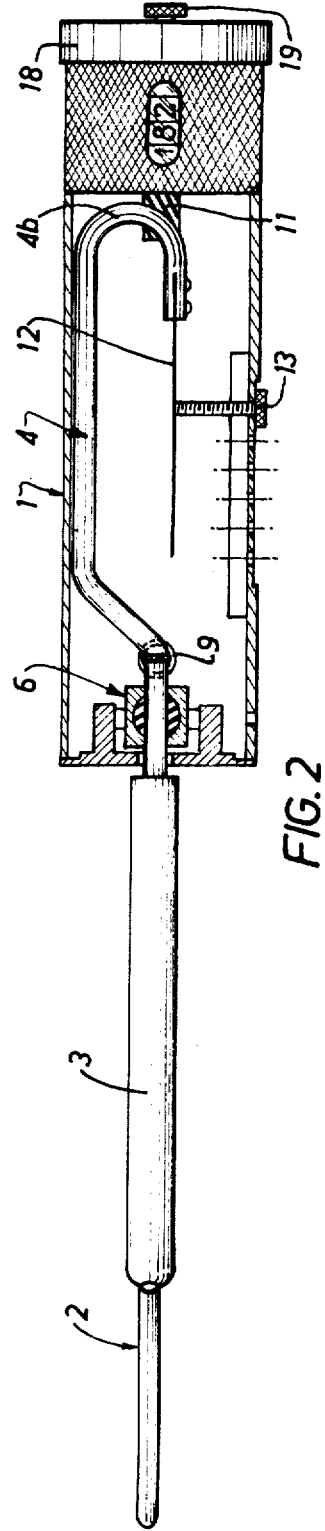
FIG. 2 is a top view, partially in section taken along the line II—II of FIG. 1.

Referring now to the drawings, and more particularly to FIGS. 1 and 2, it will be seen that reference numeral 1 indicates the handle of a carding device according to the invention adapted to treat moist hair and reference numeral 2 indicates the carding member associated therewith. The member 2 is a simple comb held along the toothless edge thereof by gripping means 3, one of the ends (3a) of which holds the end 4a of a rod 4. The handle 1 is substantially cylindrical and the rod 4 penetrates into the handle 1 through a hole 5 in one of the ends of the cylinder which constitutes the handle 1. Inside the handle 1 is a universal joint 6. This universal joint comprises a shaft 7 perpendicular to the longitudinal median plane of the comb 2, which shaft is supported at its ends by the body of the handle 1, and a shaft 8 perpendicular to the shaft 7 lying in the plane of the comb 2, with the shaft 8 adapted to pivot inside the member 6. The member 6 and the shaft 8 are traversed by the end 4a of the rod 4 and this rod is biased by a balancing spring 9, one end of which is attached to the inside of the handle 1 while its other end is hooked over the rod 4 at a point on the side of the universal joint 6 remote from the comb 2. This spring counterbalances the torque on the shaft 7 due to the weight of the comb 2.

The end of the rod 4 which is remote from the end 4a has been designated 4b and carries a half flat 10 lying in a plane substantially perpendicular to the shaft 8. This half flat is urged by the spring 9 against a friction roller 11 lined with a rubbery material. The end 4b of the rod 4 is hook shaped and the zone of this end which rests on the friction wheel 11 is the semi-circular part of third hook. On the bentback tip of the end 4b is mounted a leaf spring 12 substantially parallel to the longitudinal median plane of the comb 2. The end of an adjusting screw 13 carried by the handle 1 bears against the leaf spring 12. Several threaded holes are provided in the handle 1 to make it possible to vary the position of the screw 13 so that, in dependence on the length of the leaf spring between the point against which the screw 13 bears and the end 4b of the rod 4, an adjustable return force may be provided by the user as a consequence of the choice of position of the screw 13.

The friction roller 11 is fixed to the control shaft 14 of a counter 15. The control shaft 14 passes all the way through the counter 15 and is fixed at the end which does not carry the roller 11, to a ratchet wheel 16 cooperating with a pawl 17 carried by a box 18 fixed to the body of the handle 1. The pawl 17 is biased by a leaf spring carried by the box 18 and not shown on the drawing. It permits rotation of the ratchet wheel 16 in one direction and prevents this rotation in the other direction. The shaft 14 carries at the end carrying the ratchet wheel 16 a knurled knob 19 making it possible to impart translational movement to this shaft so that the ratchet wheel may be released from the pawl 17 to permit the counter to be reset to zero. The body of the handle 1 is provided with an opening 1a through which the figures indicated by the counter 15 may be seen.

The operation of the device which has just been described is easily understood. When the user introduces the comb into the hair he exerts on said comb an action in a direction counteracting the weight of the comb because of the application of the comb to the hair and, possibly, to the head which carries the hair. This action results in pivotal movement of the comb 2 and the rod 4 about the shaft 7 and application of the flat 10 against the friction wheel 11. When the user untangles a mass of hair by passing the comb 2 through the hair, the resistance due to the untangling of the hair causes the comb 2 to have a tendency to rotate about the axis 8. The combing force produces a rotation around the axis 8 which results in a displacement of the end 4b of the rod 4 and consequently by frictional engagement of the half flat 10 against the roller 11 and in rotation of the roller 11 and the shaft 14 of the counter 15. When an untangling movement ends, the comb 2 returns to its initial position in response to the pressure of the leaf spring 12 and the counter 15 cannot turn in the opposite direction because of the cooperation between the ratchet wheel 16 and the pawl 17. There is thus recorded a measurement corresponding to the maximum angular displacement undergone by the comb 2 in the course of the untangling movement. The position of the screw 13 is so selected that the maximum angular displacement of the comb 2 during untangling is less than the maximum possible angular movement of the rod 4 inside the handle 1. There is thus added on the register of the counter 15 at each combing movement, a quantitative measurement of the maximum effort applied. The addition stops when the untangling terminates, since at this moment the force required for the passage of the comb 2 through the hair is substantially zero and does not result in angular displacement of the comb 2 with respect to the handle 1.

Referring now to the embodiment illustrated in FIGS. 3 to 6, it will be seen that reference numeral 21 indicates the handle of a carding device adapted to card dry hair and reference numeral 22 indicates the brush associated therewith. The member 22 is a half round brush of a conventional type. It is supported by a brace 23, one end 23a of which is attached to the end 24a of a crank shaft 24. The handle 21 is substantially cylindrical and the crank shaft 24 penetrates into the handle 21 through one of the ends of the cylinder which constitutes said handle. It is supported in this end by a bearing 25. The crank shaft 24 carries on a half flat 30 an angle member 31 one arm of which is fixed to the half flat 30 and the other arm of which carries a series of leaf springs 32 substantially parallel to the half flat 30. The handle 21 carries a screw 33 the end of which abuts against one of the leaf springs 32. Several threaded holes are provided in the handle 21 so as to make it possible to select the position of the screw 33 so that it may cooperate with any one of the leaf springs 32. The different leaf springs 32 have different stiffnesses, which makes it possible, during a rotation of the pivoting shaft 24, to apply thereto a return force which is greater or less in dependence upon the position selected for the screw 33. The end of the crank shaft 24 opposite the end 24a has been designated by 24b. It is fixed to a ratchet wheel 36 which cooperates with pawl 37 carried by a pawl support 38. The pawl support 38 is fixed to a shaft 41 which is rotatably mounted in ball bearings 42 inside a bearing support 43 fixed to the handle 21. The end 24b of the crank shaft 24 is seated in the center of the pawl support 38 and its rotation is independent of that of said pawl support because of the ball bearings 44.

The shaft 41 carries at one end a pinion 45 which engages a pinion 46 carried by an intermediate shaft 47 mounted in the bearing support 43.

The pinion 46 is fixed to another pinion 48 which itself engages a pinion 49 carried by the control shaft 34 of the counter 35. The gear train 45, 46, 48, 49 makes it possible to obtain a multiplication ratio of 12 between the rotation of the input shaft 41 and the rotation of the control shaft 34. In other words, pivotal movement of the crank shaft 24 through 30° results in a rotation of the control shaft 34 through 360°. The display register of the counter 35 is positioned opposite an opening 21a in the handle 21 so that the user can read the indicia on the counter 35 from outside the handle 21. The control shaft 34 is adapted to move translationally with the shaft 41 and the pawl support 38. It may be subjected to translational movement by means of a button 39 on the side of the counter 35 remote from the shaft 41. This makes it possible to reset the counter to zero without interference from the ratchet wheel 36.

The operation of the device which has just been described will be readily understood. When the user undertakes to untangle a mass of dry hair with this apparatus he engages the hairs of the brush 22 in the hair being untangled and imparts to the brush a pivotal movement due to movement of his hand. Because of the tangling of the hair a resistive force is applied to the brush 22 so that a torque is exerted on this brush which tends to rotate the crank shaft 24. This rotation is transmitted to the shaft 41 through the clutch consisting of the ratchet wheel 36, its pawl 37 and the ratchet support 38, it being understood that the pawl 37 is urged against the ratchet wheel by spring means (not shown) and that rotation of the ratchet wheel relative to the pawl support is not permitted in the direction of the rotation to which the pivoting shaft 24 is subjected in the course of untangling of the hair. The rotation of the brush 22 is thus transmitted to the shaft 41 and through the gear train 45, 46, 48, 49 to the control shaft 34 of the counter 35. There is consequently recorded on the counter the maximum amplitude of rotation of the brush 22 in the course of the untangling movement applied to the hair. When the resistive torque is no longer applied to the brush 22 it returns to its initial position in response to the return force applied thereto by the leaf spring 32 opposite the screw 33. This return movement is not transmitted to the control shaft 34 because of the interposition between these two shafts of the overrunning clutch consisting of the ratchet wheel 36, pawl 37 and ratchet support 38. The leaf spring 32 is so selected that the maximum amplitude of rotation of the brush 22 with respect to the handle 21 during untangling never reaches the maximum possible angular displacement of the brush 22 with respect to the handle 21. The counter thus registers quantitative measurements corresponding to the sum of the maximum torques applied in the course of untangling to the brush 22, it being understood that when untangling has been completed the residual torque applied to the brush does not produce any rotation of the counter.

It is clear that the two devices which have just been described make it possible to quantitatively measure the efficacity of certain cosmetic products to the extent that they facilitate the untangling of the hair after treatment. This eliminates the subjective character of the comparisons which are necessary.

It will of course be appreciated that the embodiments which haave just been described have been given pruely by way of illustration and example and may be modified as to detail without thereby departing from the basic principles of the invention.

What is claimed is:

1. Carding device for measuring the difficulty of untangling a mass of hair, said device comprising a handle adapted to be held in the hand, a carding member capable of movement from an original position through an arc of limited amplitude with respect to the handle when a carding force is exerted on said carding member, spring means for resisting movement of said carding member through said arc and for returning said carding member to said original position when said force is relieved, and a resettable counter responsive to relative movement between the carding member and the handle for registering the sum of the amplitudes of a succession of said relative movements.

2. Carding device as claimed in claim 1 in which the counter is driven by a control shaft connected to said carding member through an intervening clutch.

3. Carding device as claimed in claim 1 in which the counter comprises a control shaft which is associated with non-return means permitting its rotation in one direction but preventing such rotation in the opposite direction.

4. Carding device as claimed in claim 3 in which the non-return device comprises a ratchet wheel cooperating with at least one pawl.

5. Carding device as claimed in claim 3 in which the non-return device is a clutch.

6. Carding device as claimed in claim 2 further comprising step-up or step-down gearing connected between the clutch and the control shaft for the counter.

7. Carding device as claimed in claim 1 in which the return spring is a leaf spring, one end of which is mounted to move with the carding member, and the other end of which rests against a member fixed to the handle.

8. Carding device as claimed in claim 7 in which the member fixed to the handle and against which the return spring rests is a screw, the position of said screw being adjustable to permit adjustment of the return force to which the carding member is subjected.

9. Carding device as claimed in claim 1 in which the carding member is a comb.

10. Carding device as claimed in claim 1 in which the carding member is a brush.

11. Carding device according to claim 1 in which the carding member is connected to the handle through a universal joint having two substantially perpendicular axes, the first of which is substantially perpendicular to the longitudinal median plane of the carding member.

12. Carding device as claimed in claim 11 in which the carding member is fixed to a rod extending to the side of the universal joint remote from said carding member, said rod being subjected to the action of two springs, one of which counterbalances the torque exerted by the weight of the carding member tending to produce rotation about the first pivotal axis of the universal joint and the other of which exerts a return force during relative movement of the carding member with respect to the handle about the second axis of the universal joint.

13. Carding device as claimed in claim 11 in which the rod connected to the carding member bears against a friction roller fixed to the control shaft of the counter, the bearing force of said rod against said roller being increased when the carding member tends to turn about the first pivotal axis of the universal joint in response to a force opposing that exerted by the weight of the carding member.

14. Carding device as claimed in claim 1 in which the carding member is fixed to a crank shaft having an arm substantially parallel to the axis of the handle, said shaft being adapted to pivot about the longitudinal axis of the handle and drive said counter.

15. Carding device as claimed in claim 14 in which the crank shaft is attached to at least one leaf spring which bears against a fixed member on the handle.

16. Carding device as claimed in claim 14 in which the counter comprises a control shaft connected to the crank shaft by a clutch comprising a ratchet wheel, a pawl, and a pawl support, said clutch driving a a single direction of rotation, said ratchet wheel being carried by the crank shaft and the pawl support being fixed to the control shaft of the counter.

17. Carding device as claimed in claim 16 in which one end of the crank shaft is supported in bearing means seated in the central part of the pawl support.

18. Carding device as claimed in claim 17 further comprising a multiplying gear train between the pawl support and control shaft of the counter which causes the control shaft of the counter to rotate through an amplitude greater than that through which the crank rotates.

19. Carding device as claimed in claim 1 which is adapted to be held stationary while the hair to be untangled is displaced relative thereto.

* * * * *